Oct. 21, 1924.  
G. R. RADLEY  
1,512,135  
ELECTRIC GENERATING SYSTEM  
Filed March 17, 1921
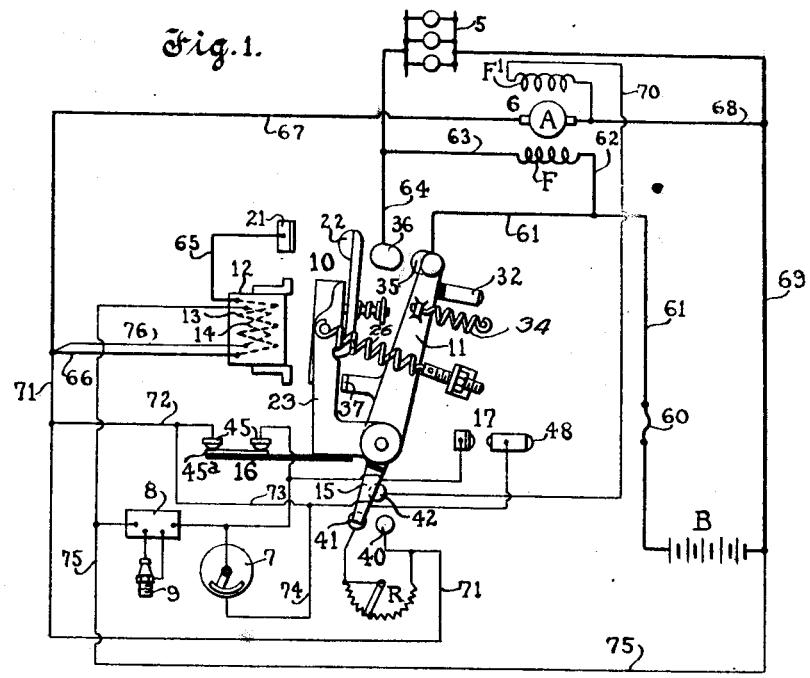
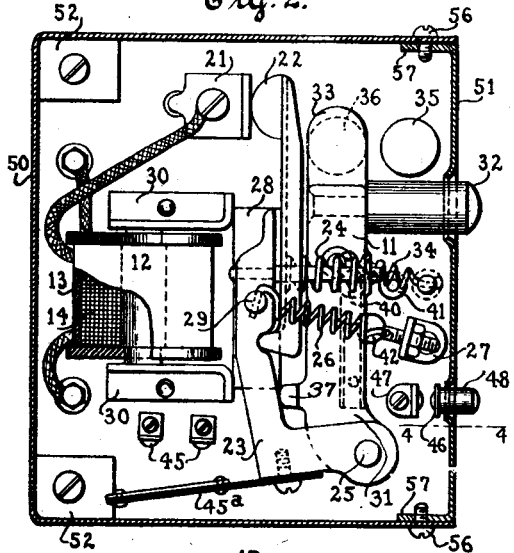
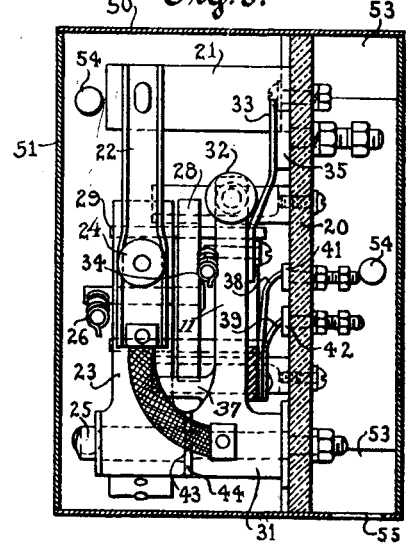
INVENTOR.  
Guy R. Radley  
BY  
ATTORNEY GUY R. RADLEY, OF MILWAUKEE, WISCONSIN, ASSIGNOR TO THE CUTLER-HAMMER MFG. CO., OF MILWAUKEE, WISCONSIN, A CORPORATION OF WISCONSIN.

ELECTRIC-GENERATING SYSTEM.

Application filed March 17, 1921. Serial No. 452,919.

*To all whom it may concern:*

Be it known that I, GUY R. RADLEY, a citizen of the United States, residing at Milwaukee, in the county of Milwaukee and State of Wisconsin, have invented new and useful Improvements in Electric Generating Systems, of which the following is a full, clear, concise, and exact description, reference being had to the accompanying drawing, forming a part of this specification.

This invention relates to electric generating plants or systems and while not limited thereto is particularly applicable to so-called farm lighting systems.

Such systems ordinarily include a storage battery, an internal combustion engine and a dynamo electric machine to be driven as a generator by the engine for charging the battery and to act as a motor for cranking the engine. Compound wound dynamo electric machines have been used in such systems, but heretofore the series field winding was used only during electrical cranking of the engine, or in other words the dynamo electric machine was used as a compound motor during cranking and as a shunt generator during charging. In practice it has been found that when the machine acts as a shunt generator a relatively small load on the service circuit produces a relatively large drop in the charging current supplied to the battery.

The present invention has among its objects to provide a system of the aforesaid character wherein the series winding of the machine is utilized during charging to maintain the charging current substantially constant irrespective of the load on the service circuit.

Another object is to provide a simple and reliable controller for effecting the necessary circuit changes for utilization of the series field winding for the aforesaid purpose.

Another object is to provide an exceedingly sensitive controller of the aforesaid character which insures interruption of the charging circuit upon a predetermined value of reverse current in said circuit.

Various other objects and advantages of the invention will hereinafter appear.

In the accompanying drawing wherein is illustrated an embodiment of the invention;

Fig. 1 diagrammatically illustrates a system embodying the invention;

Fig. 2 is a side elevational view partly in section of the controller diagrammatically illustrated in Fig. 1;

Fig. 3 is a front elevational view partly in section of the controller shown in Fig. 2; and Fig. 4 is a fragmentary sectional view taken on lines 4—4 of Fig. 2.

Referring to Fig. 1, the same illustrates a so-called farm lighting plant or system comprising a battery B, a load circuit indicated generally at 5 to be supplied thereby and a dynamo-electric machine 6 for supplying current to said battery and to said load circuit. Said machine is provided with an armature A, a series field winding F and a shunt field winding F' and the same is adapted to be driven by an internal combustion engine indicated by a timer 7, ignition coil 8 and spark plug 9. A controller including a main switch 10 and a series field commutating element 11 is provided for connecting the dynamo electric machine across the terminals of battery B for electrical cranking of the internal combustion engine and for varying such connections as hereinafter set forth to charge battery B and supply current to load circuit 5. The main switch 10 is provided with a retaining magnet 12 having a series winding 13 and a shunt winding 14 and the series field commutating element 11 has an auxiliary switch 15 associated therewith for including and excluding a regulating rheostat R in the shunt field circuit of the dynamo electric machine. Also the controller includes a normally closed switch 16 associated with said main switch and a normally open push button switch 17 for controlling the ignition circuit of the engine.

An embodiment of the controller is illustrated in Figs. 2, 3 and 4 the same including an insulating base 20 providing a support for the various switches aforementioned. The main switch 10 includes a stationary contact 21 secured to the face of said insulating base and a co-operating movable contact 22 yieldingly secured to a supporting member 23 by a conventional form of spring pressure device 24. The supporting member 23 is pivotally mounted on a pin 25 secured to base 20 and is biased to move in a clockwise direction by a tension spring 26 adjustably secured to a bracket 27 fixed to insulating base 20. Said suppieces 30 fixed to base 20 and arranged to be engaged by said armature when contact 22 is moved into closed position.

As shown in Fig. 3, the series field commutating element 11 is arranged between base 20 and supporting member 23 and the same includes a supporting member 31 having its lower end pivotally mounted on pin 25 and having a push button 32 secured to its upper end. Supporting member 31 has a spring contact 33 secured to the inner face thereof and is biased by a spring 34 to a position wherein said spring contact engages a fixed contact 35. Member 31 is movable against the action of spring 34 to a position wherein spring contact 33 engages a fixed contact 36 and during such movement a lug 37 on said member engages the right face of supporting member 23 to move contact finger 22 of main switch 10 from open position into closed position. Member 31 also carries auxiliary spring contacts 38 and 39, which are insulated therefrom and are arranged to selectively bridge fixed contacts 40 and 41 with a fixed contact 42. Contacts 33, 38 and 39 tend to force member 31 outwardly on pin 25 and to prevent binding of supporting member 23 by such outward movement, pin 25 is shouldered at 43, and a washer 44 is provided between said shoulder and member 31.

Ignition switch 16 comprises a pair of stationary contacts 45 secured to the face of insulating base 20 and a normally open bridging contact 45ᵃ secured to supporting member 23 of main switch 10 through the medium of an insulating member. As shown in Figs. 2 and 4, push button switch 17 includes a resilient contact 46, having its lower end secured to insulating base 20, as shown in Fig. 4, and a rigid contact 47 also secured to said base and arranged to be engaged by said former contact upon depression of a push button 48 secured to the upper end of the latter.

The aforedescribed controller is provided with an enclosing casing comprising interfitting sheet metal parts 50 and 51, the part 50 being formed to provide the rear and top and bottom walls of the casing and the part 51 being formed to provide the front and side walls of the casing. Insulating base 20 is secured to lugs 52 formed by forwardly bent portions on the upper and lower right hand corners of the rear wall of part 50 and as shown in Fig. 3 said lugs provide outlets 53 in the rear wall of the casing for the various leads. The rear wall is also provided with openings 54 to receive screws for attaching the casing to a suitable support, while the bottom wall is provided with an opening 55 for receiving external part 51 is secured to the top and bottom walls of part 50 by screws 56 passing through said walls into lugs 57 formed on part 51.

The manner of operation of the aforedescribed controller will now be more fully set forth. Assuming that the push button 32 is depressed to move the several parts of the controller from normal position to the position shown in Fig. 2, with the connections shown in Fig. 1 circuit will be established from the left hand terminal of battery B through a fuse 60 by conductors 61 and 62 through series field F, by conductors 63 and 64 to contact 36 through the field commutating element 11 and main switch 10 to contact 21 of the latter by conductor 65 through series winding 13 by conductors 66 and 67 through armature A and by conductors 68 and 69 to the right hand terminal of battery B. Also circuit for the shunt field F' will be established from right hand terminal of armature A through said field winding by conductor 70 to stationary contact 42 through contacts 38 and 39 to stationary contact 40 and by conductors 71 and 67 to the left hand terminal of armature A, thus providing for excitation of said shunt field by the full battery voltage. The dynamo electric machine being thus connected across the battery is adapted to act as a compound motor to crank the engine. Also practically at the moment of closure of main switch 10 bridging contact 45ᵃ disengages contacts 45 thus connecting the ignition coil across armature A by a circuit extending from the left hand terminal of said armature by conductors 67, 71, 72, 73 and 74 through timer 7 and coil 8 and by conductors 75, 69 and 68 to the right hand terminal of said armature.

The dynamo electric machine is thereupon adapted to act in the well known manner first as a motor for cranking the engine and thereafter as a generator as soon as the engine develops sufficient power to drive the former above its speed as a motor.

As before stated, the magnet 12 is provided with a shunt winding 14 and as shown in Fig. 1, the same is connected across armature A by a circuit extending from the left hand terminal of said armature by conductors 67 and 76 through said winding and by conductors 75, 69 and 68 to the right hand terminal of said armature. During cranking the series winding 13 acts in opposition to the shunt winding 14 but as soon as the dynamo electric machine acts as a generator the current in said former winding reverses and the same then acts cumulatively with the latter winding to hold the main switch 10 in closed position against commutating element 11 is released by the operator to permit return thereof to normal position. Upon return of said element to normal position the circuit connections are varied so that the left hand terminal of armature A is connected to the left hand terminal of battery B exclusive of the series field winding F by a circuit extending through contact 35 while the load circuit 5 is connected across said battery through said field winding, said circuits being apparent from the drawing. Also upon return of the field commutating element 11 contact 38 engages contact 41 to include the shunt field regulating rheostat R in circuit with shunt field F'.

It is apparent that upon establishment of the aforesaid charging connections the series field winding F has a cumulative compounding effect or in other words the same strengthens the field of the dynamo electric machine under increased load conditions in circuit 5 and weakens the field under decreased load conditions in said circuit. Thus by properly designing the series field winding the terminal voltage of the machine can be maintained substantially constant irrespective of the load conditions, while providing the well-known advantages of a tapered charge which is obtained by a shunt machine. Also it should be noted that with the aforedescribed connections a floating battery effect is obtained or in other words if the load exceeds the engine capacity the storage battery will assist the generator in supplying the load.

The shunt and series windings 13 and 14 of magnet 12 are so proportioned with respect to the adjustable spring 26 as to maintain the main switch 10 closed for a limited time following diminution or discontinuance of the engine power supply such as might occur upon partial or temporary choking of the engine carburetor, thus affording the engine an opportunity to clear itself and even assisting such action through temporary motorization of the dynamo electric machine. However, the foregoing parts are designed and adjusted to provide for opening of the main switch at a pre-determined value of reverse current in the series winding 13 which value is necessarily less than that required to maintain protracted rotation of said machine with the engine idle. It should be noted that precision in the releasing point of the main switch is obtained by providing a direct spring pull in opposition to the magnetic pull exerted by magnet 12 and also by providing for free return of the main switch without hindrance by other elements of the controller as before set forth.

Stopping of the engine and termination circuit being apparent from the drawing. It is only necessary to maintain the switch 17 closed until the speed of the engine reduces to such an extent that the main switch 10 opens and upon opening of said main switch the auxiliary switch 16 is closed to maintain said shunt circuit around timer 7. Thus it is apparent that switch 16 overcomes the necessity of keeping the push button 17 depressed until the plant actually comes to a stand-still this feature being particularly advantageous in ballbearing plants which require relatively long periods before the same come to a stand-still.

It should be noted that the aforedescribed ignition control is not limited to battery ignition but is also adapted for use with magneto ignition systems, the switches 16 and 17 being then used to short circuit the magneto to accomplish the aforedescribed results.

What I claim as new and desire to secure by Letters Patent is:

1. The combination with a storage battery of a load circuit to be supplied thereby, a dynamo electric machine having shunt and series field windings, the latter being permanently connected in said load circuit, an internal combustion engine for driving said machine and means for connecting said machine across the terminals of said battery inclusive of said series field winding for electrical cranking of said engine and for excluding said series field winding from such circuit for charging.

2. The combination with a storage battery, of a load circuit to be supplied thereby a dynamo electric machine having shunt and series field windings, an internal combustion engine for driving said machine and means including a plurality of co-operating control switches movable together to connect said dynamo electric machine across said battery inclusive of said series field winding for electrical cranking of said engine, one of said switches being thereafter operable independently of the other to connect said series field winding in said load circuit in a reversed relation with respect to the armature of said machine for charging.

3. The combination with a battery, a load circuit to be supplied thereby, a dynamo electric machine having shunt and series field windings, an internal combustion engine for driving said machines, means including a plurality of co-operating control switches to be operated together to connect said dynamo electric machine across said battery inclusive of said series field winding for electrical cranking of said engine, one of said switches being thereafter operable indeture of said machine for charging, and electro-magnetic retaining means associated with the other of said switches.

4. The combination with a battery, a load circuit to be supplied thereby, a dynamo electric machine having shunt and series field windings, an internal combustion engine for driving said machine, means including a plurality of control switches movable together out of a given position to connect said dynamo electric machine across said battery, inclusive of said series field winding for electrical cranking of said engine, one of said switches being returnable to said position independently of the other to connect said series field winding in said load circuit in a reversed relation with respect to the armature of said machine for charging, and the other of said switches being returnable to said given position to interrupt the charging connections, and means associated with said latter switch providing for return thereof to said given position under a pre-determined material value of current discharging from said battery through said generator.

5. The combination with a battery, a load circuit to be supplied thereby, a dynamo electric machine having shunt and series field windings an internal combustion engine for driving said machine, a main switch biased to open position and a field commutating switch co-operating with said main switch to connect said dynamo electric machine across said battery inclusive of said series winding, said latter switch being operable independently of said main switch to include said series field winding in said load circuit in a reversed relation with respect to the armature of said machine for charging.

6. The combination with a battery and a load circuit to be supplied thereby, a dynamo electric machine having shunt and series field windings, an internal combustion engine for driving said machine, a main switch biased to open position, an electromagnet having shunt and series windings for retaining the same in closed position and a field commutating switch adapted upon movement in one direction to close said main switch, said field commutating switch co-operating with said main switch upon movement thereof in said direction to connect said dynamo electric machine across said battery inclusive of such series field winding for electrical cranking of said engine, and being thereafter operable independently of said main switch to vary said connections for inclusion of said series field winding in said load circuit in a reversed circuit to be supplied thereby, a dynamo electric machine having shunt and series field windings, an internal combustion engine for driving said machine, a main switch biased to open position, an electromagnet having shunt and series windings for retaining said switch in closed position, a field commutating switch biased towards a given position and adapted upon movement to another position to effect closure of said main switch, said latter switch co-operating with the former upon movement thereof to said latter position to connect said dynamo electric machine across the battery, inclusive of said series field winding for electrical cranking of said engine and being returnable to normal position independently of said main switch to include such series field winding in said load circuit in reversed relation with respect to the armature of said machine for charging and means associated with said main switch for rendering the ignition circuit of said engine ineffective upon opening of said main switch.

8. The combination with a battery, a load circuit to be supplied thereby, a dynamo electric machine having shunt and series field windings, an internal combustion engine for driving said machine, a main switch biased to open position, a field commutating element movable in one direction to close said main switch and to establish an energizing circuit for said machine through said main switch inclusive of said series field winding for electrical cranking of said engine, said field commutating element being movable to another position independently of said main switch to connect said series field winding in said load circuit in a reversed relation with respect to the armature of said machine for charging, a retaining magnet for said main switch having a shunt winding connected across the armature of said machine and a series winding to be included in the armature circuit of said machine upon closure of said main switch, said windings being proportioned to insure opening of said main switch under a pre-determined material value of current discharging from said battery through said generator.

9. The combination with a battery, a load circuit to be supplied thereby, a compound wound dynamo electric machine, an internal combustion engine for driving said machine, a switch having an on position and an off position, a second switch having extreme positions, means biasing said latter switch to one of said extreme positions, said latter switch being interlocked with the former other of its extreme positions effects movement of said former switch into its on position and circuit connections providing for connection of said dynamo electric machine across said battery inclusive of said series field winding upon movement of said latter switch into its last-mentioned position and providing for inclusion of said series field winding in said load circuit in a reversed relation with respect to the armature of said machine upon return of said latter switch to its first-mentioned position.

10. The combination with a battery, a load circuit to be supplied thereby, a compound wound dynamo electric machine, an internal combustion engine for driving operated switches to be operated selectively to connect said dynamo electric machine across said battery inclusive of said series field winding for electrical cranking and to vary said connections for inclusion of said field winding in said load circuit in a reversed relation with respect to the armature of said dynamo electric machine for charging, and means associated with one of said switches to insure interruption of said charging connections under a predetermined value of current discharging from said battery through said generator.

In witness whereof, I have hereunto subscribed my name.

GUY R. RADLEY.